(12) United States Patent
Xu et al.

(10) Patent No.: US 8,457,494 B2
(45) Date of Patent: Jun. 4, 2013

(54) PON MULTICAST COMMUNICATION SYSTEM, MULTICAST MANAGEMENT METHOD, AND CORRESPONDING DEVICES

(75) Inventors: Xiaogeng Xu, Shenzhen (CN); Jianlin Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 501 days.

(21) Appl. No.: 12/503,476

(22) Filed: Jul. 15, 2009

(65) Prior Publication Data

US 2009/0274461 A1    Nov. 5, 2009

Related U.S. Application Data

(63) Continuation of application No. PCT/CN2008/072463, filed on Sep. 23, 2008.

(30) Foreign Application Priority Data

Sep. 28, 2007 (CN) .......................... 2007 1 0030600

(51) Int. Cl.
*H04J 14/00* (2006.01)

(52) U.S. Cl.
USPC ............................. 398/66; 398/89; 370/270

(58) Field of Classification Search
USPC .................................................. 370/270, 390
See application file for complete search history.

(56) References Cited

U.S. PATENT DOCUMENTS

| | | | |
|---|---|---|---|
| 7,630,637 B2 * | 12/2009 | Mizutani et al. ................. | 398/67 |
| 2005/0135365 A1 | 6/2005 | Sung et al. | |
| 2006/0176835 A1 | 8/2006 | Jang et al. | |
| 2007/0217416 A1 * | 9/2007 | Okuda .......................... | 370/390 |

FOREIGN PATENT DOCUMENTS

| | | |
|---|---|---|
| CN | 1578200 A | 2/2005 |
| CN | 1855834 A | 11/2006 |
| CN | 1864433 A | 11/2006 |
| CN | 101094087 A | 12/2007 |
| JP | 2004-214758 | 7/2004 |
| WO | WO 2006/092778 A1 | 9/2006 |
| WO | WO 2007/082490 A1 | 7/2007 |

OTHER PUBLICATIONS

Communication pursuant to Article 94(3) EPC issued by the European Patent Office for Application No. 08 800 952.7-2416, dated Sep. 29, 2011, 5 pages.

First Chinese Office Action dated (mailed) Nov. 1, 2010, issued in related Chinese Application No. 200710030600.2 Huawei Technologies C., Ltd.

(Continued)

*Primary Examiner* — Danny Leung (74) *Attorney, Agent, or Firm* — Brinks Hofer Gilson & Lione (57) ABSTRACT

A Passive Optical Network (PON) multicast management method includes: an Optical Line Terminal (OLT) performs multicast control according to multicast control information, and generates a corresponding multicast downstream command; the OLT sends the multicast downstream command to an Optical Network Unit (ONU); and the ONU resolves the multicast downstream command, and performs multicast control according to the multicast downstream command. Accordingly, a PON multicast communication system, an OLT, and an ONU are disclosed. Through the multicast control mechanism introduced into the PON system, the PON multicast functions are enhanced, and the same data destined for multiple ONUs is prevented from being sent repeatedly in the network, and thus the network bandwidth resources are saved.

5 Claims, 9 Drawing Sheets

OTHER PUBLICATIONS

Zhang, W. et al., "The Implementation of LL ID Multicast in EPON" Study on Optical Communications, China Academic Journal Electronic Publishing House Mar. 2005.

European Communication pursuant to Rule 62 EPC, the supplementary European search report (Art. 153(7) EPC) and the European search opinion for Application No. 08 800 952.7, dated Dec. 4, 2009, 7 pages.

English translation of the Written Opinion of the International Searching Authority for International application No. PCT/CN2008/072463, mailed Nov. 6, 2008, 4 pgs.

International Telecommunication Union; ITU-T: Telecommunication Standardization Sector of ITU; G.873.1; Series G: Transmission Systems and Media, Digital Systems and Networks; Digital Networks—Optical transport networks; Optical Transport Network (OTN): Linear protection, dated Mar. 2006, 23 pgs.

International Telecommunication Union; ITU-T: Telecommunication Standardization Sector of ITU; G.808.1; Series G: Transmission Systems and Media, Digital Systems and Networks; Digital Network—General aspects; Generic Protection Switching—Linear Trail and Subnetwork Protection, dated Mar. 2006, 59 pgs.

International Telecommunication Union; ITU-T: Telecommunication Standardization Sector of ITU; G.798; Series G: Transmission Systems and Media, Digital Systems and Networks; Digital Terminal Equipments—Other Terminal Equipment; Characteristics of Optical Transport Network Hierarchy Equipment Functional Blocks, dated Dec. 2006, 318 pgs.

International Search Report from P.R. China in International Application No. PCT/CN2008/072463 mailed Nov. 6, 2008.

IEEE Standard 802.3av™-2009, Part 3: Carrier Sense Multiple Access with Collision Detection (CSMA/CD) Access Method and Physical Layers Specifications; Amendment 1: Physical Layer Specifications and management Parameters for 10 Gb/s Passive Optical Networks; Oct. 30, 2009 (236 pgs.).

ITU-T Recommendation G.983.2 (2005)—Amendment 2, Series G: Transmission Systems and Media, Digital Systems and Networks; Digital sections and digital line system—Optical line system for local and access networks; ONT management and control interface specification for B-PON; Jan. 2007 (64 pgs.).

ITU-T Recommendation G.984.1 (Mar. 2003), Series G: Transmission Systems and Media, Digital Systems and Networks; Digital sections and digital line system—Optical line system for local and access networks; Gigabit-capable Passive Optical Networks (GPON): General characteristics (22 pgs.).

First Chinese Office Action (translation) of Chinese Patent Application No. 200710030600.2, mailed Dec. 31, 2011; Chinese language Office Action (17 pgs.).

Office Action issued in corresponding Chinese Patent Application No. 200710030600.2, mailed Sep. 5, 2012.

* cited by examiner

PON MULTICAST COMMUNICATION SYSTEM, MULTICAST MANAGEMENT METHOD, AND CORRESPONDING DEVICES

CROSS-REFERENCE TO RELATED APPLICATION

This application claims priority to International Patent Application No. PCT/CN2008/072463, filed on Sep. 23, 2008, which claims the benefit of priority to Chinese Patent Application No. 200710030600.2, filed with the Chinese Patent Office on Sep. 28, 2007 and entitled "PON Multicast Communication System, Multicast Management Method, and Corresponding Devices", the entire contents of both of which are incorporated herein by reference in their entirety.

FIELD OF THE DISCLOSURE

The present disclosure relates to optical communications, and in particular, to a Passive Optical Network (PON) multicast communication system, a multicast management method, an Optical Line Terminal (OLT), and an Optical Network Unit (ONU).

BACKGROUND OF THE DISCLOSURE

With the emergence of multimedia services such as Internet Protocol Television (IPTV) and High Definition Television (HDTV) and the growth of data services, stricter requirements are imposed on the access bandwidth. In the current access network, optical cables are replacing copper cables, and optical lines are closer to end users. Therefore, the PON is undoubtedly a preferred solution to broadband access. A PON is composed of three parts: OLT and Optical Distribution Network (ODN), which are installed in the central office, and ONU, which is installed in the user premises. In the downstream direction, the service is transmitted in broadcast mode; and in the upstream direction, multiple ONUs access the network in Time Division Multiplexing (TDM) mode.

Currently, the PON system is categorized into the following types: ATM Passive Optical Network (APON) whose transmission platform is based on the Asynchronous Transfer Mode (ATM), Ethernet Passive Optical Network (EPON) whose transmission platform is based on the Ethernet technology, and Gigabit Passive Optical Network (GPON) whose transmission platform is based on a universal frame structure. The frame structure of a PON (taking the GPON as an example) is described below.

Figure 1:
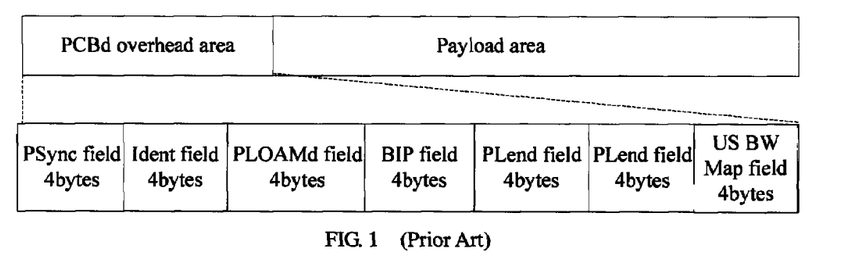
FIG. 1 shows a downstream frame structure in a GPON in the prior art.

As shown in FIG. 1, in a GPON, the downstream frame is a 125 µs frame structure, and includes a Physical Control Block downstream (PCBd) overhead area and a payload area. The PCBd overhead area includes a Physical Synchronization (PSync) field, a super frame indication (Ident) field, a Physical Layer Operations, Administration and Maintenance downstream (PLOAMd) field, a Bit Interleaved Parity (BIP) field, a Payload Length downstream (PLend) field, and an Upstream Bandwidth Map (US BW Map) field. The PLOAMd field carries downstream Physical Layer OAM (PLOAM) information.

Figure 2:
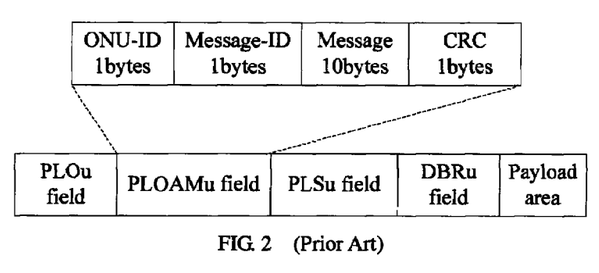
FIG. 2 shows an upstream frame structure in a GPON in the prior art.

FIG. 2 shows the upstream frame structure in a GPON. Each ONU sends upstream burst packets to the OLT in the T-CONT allocated by the OLT to the ONU. Each of the upstream burst packets includes an overhead area and a payload area. The overhead area includes a Physical Layer Overhead upstream (PLOu) field, a Physical Layer OAM upstream (PLOAMu) field, a Physical Layer Sequence upstream (PLSu) field for adjusting power, and a Dynamic Bandwidth Report upstream (DBRu) field. The PLOAMu field carries upstream PLOAM information.

Figure 3:
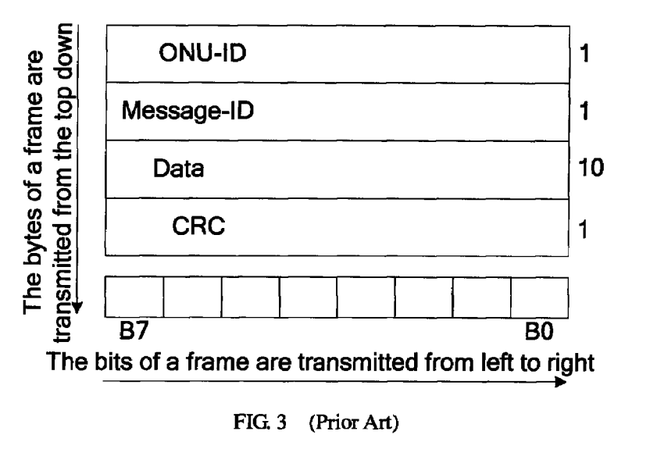
FIG. 3 shows a frame structure in a PLOAM in the prior art.

Therefore, a PLOAM field exists in both the upstream and the downstream frame structures in the GPON. As shown in FIG. 3, the PLOAM frame structure includes: an ONU identifier (ONU-ID), a Message-ID, a message, and a Cyclic Redundancy Code (CRC). There are 19 message types in the upstream direction and 9 message types in the downstream direction.

In the existing PON system, only unicast and broadcast mechanisms are available. The unicast mechanism means the communication between a single ONU and an OLT. The broadcast mechanism means the communication between all ONUs and an OLT, and the communication is performed by broadcasting 255 in the ONU-ID. The transmission of the existing video service is described below with reference to FIG. 4.

Figure 4:
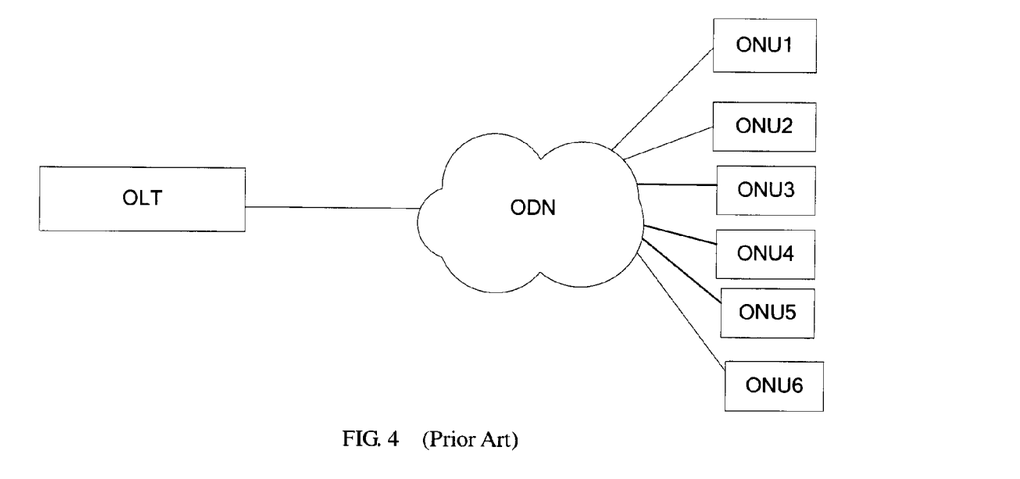
FIG. 4 shows a structure of a PON system in the prior art.

FIG. 4 shows a PON system for transmitting video services. Table 1 specifies the ONU-ID and the Port-ID. If the same data needs to be sent to the ONU1, ONU3, ONU4, and ONU5, the OLT needs to have four copies of such data, and encapsulate the data into six GPON Encapsulation Method (GEM) frames, with the Port-IDs being 11, 13, 14, and 15, respectively. The GEM frames are sent to different ONUs at different time based on the TDM principle.

TABLE 1

Mapping between ONU-ID and Port-ID

| ONU ID | Port ID |
| --- | --- |
| 1 | 11 |
| 2 | 12 |
| 3 | 13 |
| 4 | 14 |
| 5 | 15 |
| 6 | 16 |

Moreover, the distance from one ONU to one OLT is unequal to the distance from another ONU to the OLT. Therefore, the transmit power of the ONU needs to be adjusted to ensure that the upstream optical power at the OLT falls within the receiving range of the OLT. The PON system performs the adjustment for each ONU separately. In a practical system, the OLT receiver covers a specific scope, and some ONUs (for example, the ONU1, ONU3, ONU4, and ONU5) are close to each other, and may be regarded as a group for being adjusted uniformly. However, this is impossible in the prior art. The prior art can only adjust each ONU at different time in TDM mode.

In the process of implementing the present disclosure, the inventor finds at least the following defects in the prior art:

The existing PON supports only unicast and broadcast. For multiple ONUs that use the same service, the same data needs to be sent to each ONU. Consequently, the same data is sent repeatedly in the network, thus wasting bandwidth resources.

It is impossible to perform unified management and adjustment for a group of ONUs, and each ONU needs to be adjusted separately, thus leading to low efficiency.

In the existing PON system, no relevant commands are specified for multicast. With the development of the Video On Demand (VOD) service, multicast becomes one of the important functions of a PON. The "long-reach and large-split-ratio" PON system is put forward, where the quantity of ONUs in a PON is greater than the existing 128 and is expected to exceed 1000. Under this background, the multicast management for various management groups is essential.

SUMMARY OF THE DISCLOSURE

A PON multicast communication system, a multicast management method, an OLT, and an ONU are provided in embodiments of the present disclosure to enable multicast communications of a PON system.

An OLT is provided in an embodiment of the present disclosure. The OLT includes:

a control processing module configured to obtain multicast control information in received configuration data or upstream messages; and a first multicast module configured to perform multicast control according to the multicast control information, or at the same time, generate and send a corresponding multicast downstream command according to the multicast control information.

Accordingly, an ONU is provided in an embodiment of the present disclosure. The ONU includes:

a second multicast module configured to generate a corresponding multicast upstream command inclusive of multicast control information according to local multicast requirement information, where the local multicast requirement information includes information about a request for joining a multicast group, information about a request for leaving a multicast group, or information about a local current multicast group, or any combination thereof; and a second sending module configured to send an upstream message carrying a multicast upstream command to an OLT.

Accordingly, a PON multicast communication system is provided in an embodiment of the present disclosure. The system includes: an OLT, and an ONU connected to the OLT through an ODN, where the OLT includes:

a control processing module configured to obtain multicast control information in received configuration data or upstream messages; and a first multicast module configured to perform multicast control according to the multicast control information, or at the same time, generate and send a corresponding multicast downstream command according to the multicast control information.

Accordingly, a PON multicast management method is provided in an embodiment of the present disclosure. The method includes:

performing, by an OLT, multicast control according to multicast control information, and generating a corresponding multicast downstream command;

sending, by the OLT, the multicast downstream command to an ONU; and resolving, by the ONU, the multicast downstream command, and implementing multicast control according to the multicast downstream command.

According to the PON multicast communication system, the multicast management method, the OLT, and the ONU provided herein, a multicast mechanism is introduced into the PON and a multicast module is added to the OLT and the ONU to perform multicast control in a PON and to enable multicast communications of a PON system. Therefore, the PON multicast functions are enhanced, and the same data destined for multiple ONUs is prevented from being sent repeatedly in the network, and thus the network bandwidth resources are saved. In the ONU management and power adjustment, a group of ONUs which are close to each other may be managed uniformly, thus improving the system efficiency.

BRIEF DESCRIPTION OF THE DRAWINGS

To make the technical solution under the present disclosure clearer, the accompanying drawings for illustrating the embodiments of the present disclosure are outlined below. The accompanying drawings are exemplary only, and those skilled in the art can derive other drawings from such accompanying drawings without creative work.

DETAILED DESCRIPTION OF THE DISCLOSURE

The embodiments of the present disclosure provide a PON multicast communication system, a multicast management method, an OLT, and an ONU. A multicast control mechanism is introduced into the PON system and a multicast module is added to the OLT and the ONU. Therefore, the PON multicast functions are enhanced, and the same data destined for multiple ONUs is prevented from being sent repeatedly in the network, and thus the network bandwidth resources are saved.

The technical solution under the present disclosure is detailed below with reference to the accompanying drawings and exemplary embodiments.

FIG. 4 shows the whole architecture of a PON multicast communication system in an embodiment of the present disclosure. The system includes: an OLT, and an ONU connected to the OLT through an ODN, where the ODN is a network composed of optical lines and passive components such as optical splitters and connectors.

Figure 5:
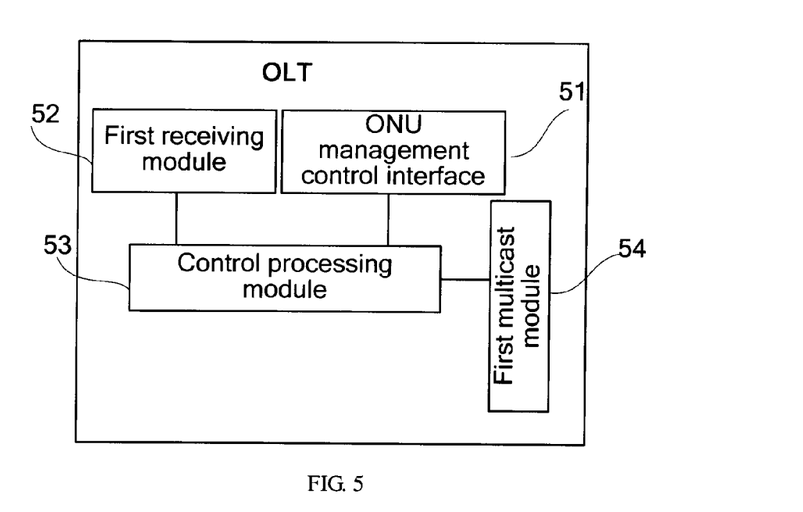
FIG. 5 shows a structure of an OLT in an embodiment of the present disclosure.

As shown in FIG. 5, the OLT includes:

an ONU management control interface 51 configured to: receive configuration data sent by the upper-layer Network Management System (NMS), and configure the OLT, where the configuration data may be default configuration performed by the upper-layer NMS for the multicast group information of the OLT or for the multicast authentication information at the initialization of the system, or may be modification or adjustment performed by the upper-layer NMS for the multicast group information of the OLT or for the multicast authentication information in the running process;

a first receiving module 52 configured to receive an upstream message from an ONU;

a control processing module 53 configured to analyze the configuration data received by the ONU management control interface 51 or the upstream message received by the first receiving module 52 to obtain multicast control information, where the multicast control information includes: the multicast upstream command carried in the upstream message, or the multicast configuration command received by the ONU management control interface such as a command for adding an ONU to a multicast group, a command for deleting an ONU from the multicast group, and a command for adding an ONU to a blacklist; and a first multicast module 54 configured to: perform multicast control according to the multicast control information provided by the control processing module 53, or at the same time, generate a corresponding multicast downstream command. If the multicast control is performed according to the multicast control information in the default configuration of the upper-layer NMS, it is possible that the downstream command does not need to be sent to the ONU immediately, but the sending of the downstream command is triggered after all configurations are completed. The multicast control may be a process of performing multicast management according to the relevant information, for example, modifying the multicast group information stored in an OLT according to the multicast control information.

Figure 6:
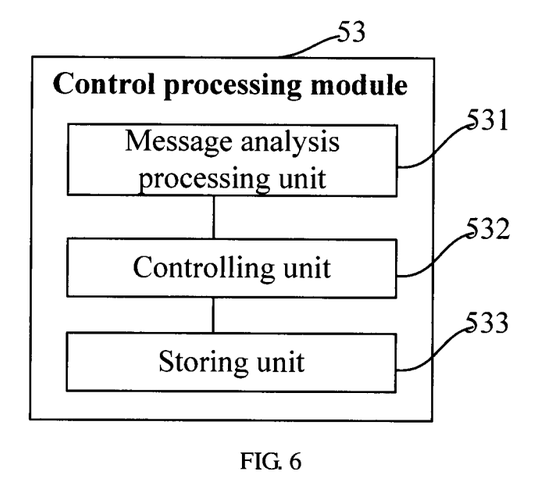
FIG. 6 shows a structure of the control processing module illustrated in FIG. 5.

In practice, as shown in FIG. 6, the control processing module 53 illustrated in FIG. 5 may include:

a message analysis processing unit 531 configured to: separate the multicast control information from the configuration data or the upstream message, and more specifically, separate the multicast configuration command from the configuration data and separate the multicast upstream command from the upstream message;

a controlling unit 532 configured to: obtain the multicast configuration command or multicast upstream command from the multicast control information, send the multicast configuration command or multicast upstream command to the first multicast module 54, and generate a downstream message out of the multicast downstream command returned by the first multicast module 54; and a storing unit 533 configured to buffer the downstream message to be sent.

Figure 7:
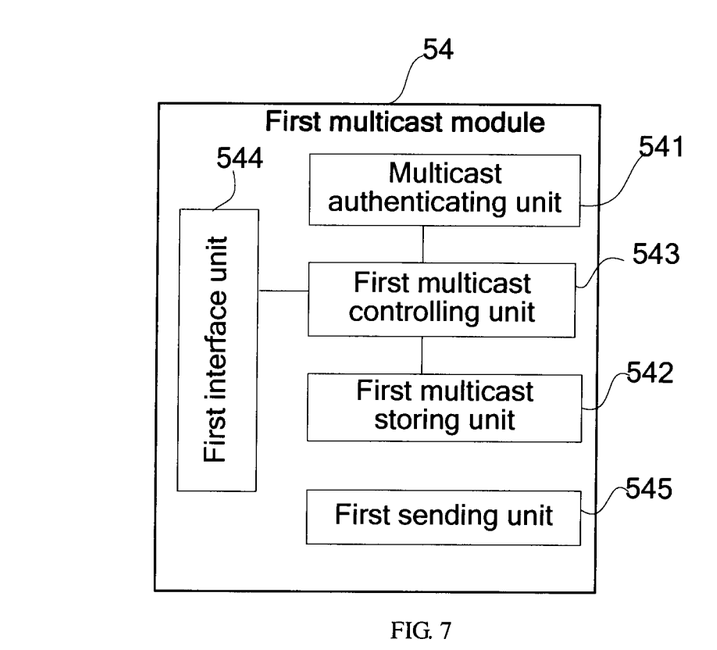
FIG. 7 shows a structure of the first multicast module illustrated in FIG. 5.

In practice, as shown in FIG. 7, the first multicast module 54 illustrated in FIG. 5 includes:

a multicast authenticating unit 541 configured to: store the multicast rights information of all ONUs, and check whether each ONU is authorized to join the multicast group according to the rights information, where: if the multicast control is performed according to the multicast control information in the configuration information sent by the upper-layer NMS, no authentication is required. That is, the configuration of the upper-layer NMS is accepted unconditionally; and, if the multicast control is performed according to the multicast control information in the upstream message sent by the ONU, authentication is required;

a first multicast storing unit 542 configured to store multicast group information, including: multicast group number, multicast Port-ID, and ONU ID in the multicast group, as shown in Table 2 (supposing each multicast group contains 6 ONUs, as shown in FIG. 4).

TABLE 2

Multicast group information in an OLT

| Multicast Group Number | ONU | Multicast Port-ID |
| --- | --- | --- |
| 1 | ONU1; ONU3 | 4081 |
| 2 | ONU2; ONU4 | 4082 |
| 3 | ONU2; ONU5; ONU6 | 4083 | a first multicast controlling unit 543 connected to the multicast authenticating unit 541 and the first multicast storing unit 542, and configured to: process the first multicast storing unit 542 according to the multicast control information when the authentication result of the multicast authenticating unit 541 indicates consent to joining the multicast group, and generate the corresponding multicast downstream command; and a first interface unit 544 configured to perform information interaction between the first multicast controlling unit 543 and the control processing module 53.

The first multicast module 54 may further include a first sending module 545, which is configured to: generate a downstream message carrying a multicast downstream command according to the multicast control information, and send the downstream message to the ONU.

Figure 8:
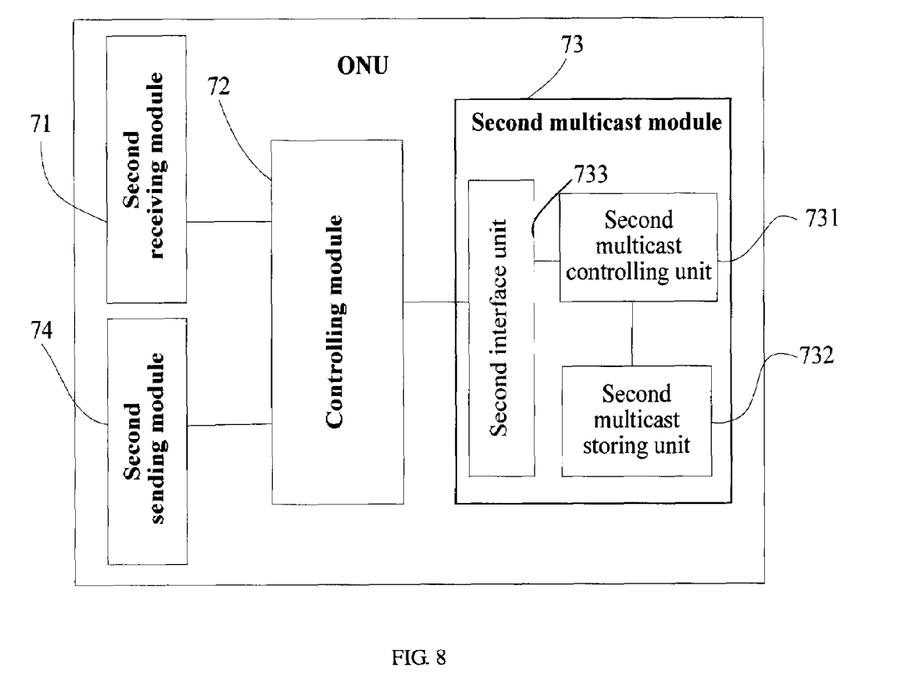
FIG. 8 shows a structure of an ONU in an embodiment of the present disclosure.

As shown in FIG. 8, the ONU includes:

a second receiving module 71 configured to receive the downstream message from the OLT;

a controlling module 72 configured to analyze the downstream message received by the second receiving module 71 to obtain a multicast downstream command;

a second multicast module 73 configured to: perform multicast control according to the multicast downstream command as a result of analysis made by the controlling module 72, and generate a corresponding multicast upstream command; and a second sending module 74 configured to send an upstream message carrying the multicast upstream command to the OLT.

The second multicast module 73 includes:

a second multicast storing unit 732 configured to store the multicast control information, including multicast group number and multicast port ID. Taking the ONU2 in Table 2 as an example, the ONU2 is included in the multicast group 2 and multicast group 3, and therefore, the data structure is shown in Table 3:

TABLE 3

Multicast control information in ONU2

| Multicast Group Number for ONU | Multicast Port-ID |
| --- | --- |
| 2 | 4082 |
| 3 | 4083 |

The second multicast module 73 also includes:

a second multicast controlling unit 731 configured to: process the second multicast storing unit 732 according to the multicast downstream command, and generate a corresponding multicast upstream command; and a second interface unit 733 configured to perform information interaction between the second multicast controlling unit 732 and the controlling module 72.

In this embodiment, the value of multicast Port-ID may be set by an operator or a service provider at their discretion. Preferably, in a GPON, the value range of Port-ID is 4-4905. To avoid great changes to the system as a result of introducing the multicast Port-ID, the values in the latter part in the multicast Port-ID value range are preferred. All Port-IDs are allocated by the OLT uniformly to prevent conflict, and managed by the OLT uniformly so that they are compatible with the old PON system which does not support multicast.

In this embodiment and all the embodiments described below, the multicast upstream commands include: a request for joining a multicast group, and a request for leaving a multicast group; and the multicast upstream command may be carried in the payload area of a GEM upstream frame or in the PLOAM field of a GEM upstream frame.

The multicast downstream commands include: consent to a multicast request, rejection of a multicast request, consent to leaving a multicast group, and forced leaving from a multicast group. The multicast downstream command may be carried in the payload area of a GEM downstream frame or the PLOAM field of a GEM downstream frame.

Supposing the multicast upstream and downstream commands are carried in the PLOAM field of the GEM upstream and downstream frames, the structures of the upstream and downstream messages are expounded below.

When the multicast upstream command is carried in the PLOAM field of the GEM upstream frame, as shown in Table 4, the fields of the upstream message include: ONU-ID, Message-ID, Command-ID, and multicast group number.

TABLE 4

Upstream message carrying a multicast upstream command
Multicast Message

| Byte | Content | Description |
|---|---|---|
| 1 | ONU-ID | Specified ONU |
| 2 | Message-ID | The Message-ID indicates that the message is a "multicast message" |
| 3 | Command-ID | The format of a Command-ID is 000000ab. If ab=00, the command indicates a request for joining a multicast group; if ab=01, the command indicates a request for leaving a multicast group |
| 4-5 | Multicast group number | Serial number of a multicast group |
| 6-12 | Undefined | |

When the multicast downstream command is carried in the PLOAM field of the GEM downstream frame, as shown in Table 5, the fields of the downstream message include: ONU-ID, Message-ID, Command-ID, multicast Port-ID, and multicast group number.

TABLE 5

Downstream message carrying a multicast downstream command
Multicast Message

| Byte | Content | Description |
|---|---|---|
| 1 | ONU-ID | Specifies an ONU. For example, if the ONU-ID is 11111111, it indicates any ONU. |
| 2 | Message-ID | Indicates that the message is a "multicast message". |
| 3 | Command-ID | The format of is 000000ab. If ab=00, the command indicates multicast group information; if ab=01, the command indicates consent to a multicast request; if ab=10, the command indicates rejection of a multicast request; and, if ab=11, the command indicates forced leaving from a multicast group |
| 4-5 | Multicast Port-ID | Specifies the Port-ID used for the multicast. |
| 6-7 | Multicast group number | Specifies the multicast group number. |
| 8-9 | Multicast Port-ID | Specifies the Port-ID used for the multicast. |
| 10-11 | Multicast group number | Specifies the multicast group number. |
| 12 | Undefined | |

Expounded above is a technical solution to a PON multicast communication system, an OLT, and an ONU in embodiments of the present disclosure. The multicast management method based on the foregoing devices is detailed below with reference to FIG. 7, FIG. 8 and FIG. 9.

Figure 9:
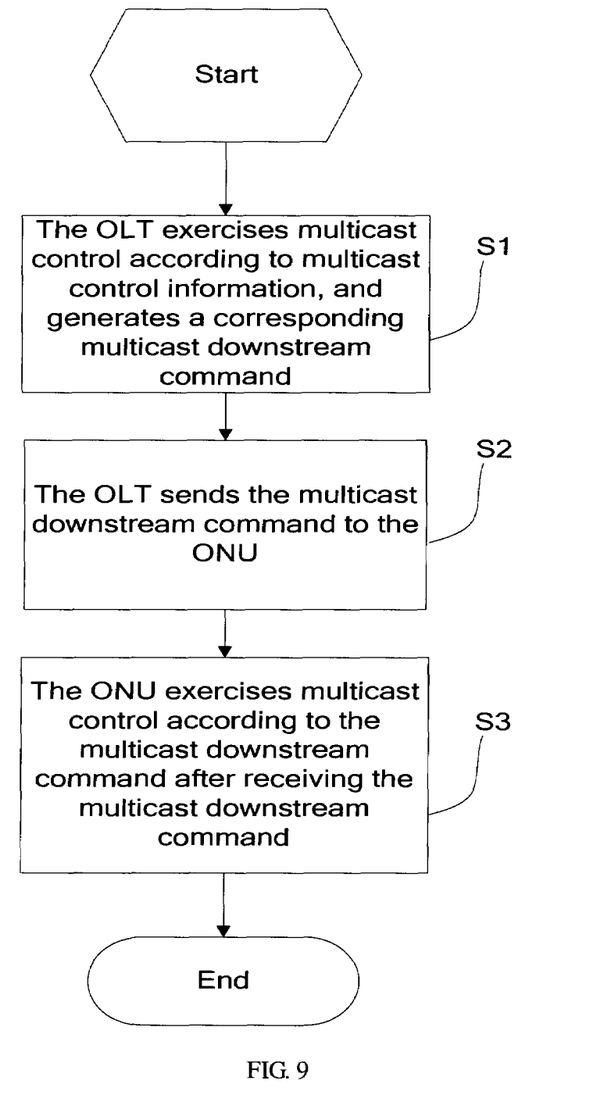
FIG. 9 is a flowchart of a PON multicast management method in an embodiment of the present disclosure.

FIG. 9 is a flowchart of a PON multicast management method in an embodiment of the present disclosure. The method includes the following steps:

Step S1: The OLT performs multicast control according to the multicast control information, and generates a corresponding multicast downstream command. The multicast control information includes: the multicast upstream command sent by the ONU, or the multicast configuration command received by the ONU management control interface, such as a command for adding an ONU to a multicast group, a command for deleting an ONU from the multicast group, and a command for adding an ONU into a blacklist.

Step S2: The OLT sends the multicast downstream command to the ONU.

Step S3: The ONU resolves the multicast downstream command, and performs multicast control according to the multicast downstream command.

When the control command is a multicast upstream command, the OLT performs multicast control according to the control command and generates the corresponding multicast downstream command in the following way:

The OLT obtains the multicast upstream command sent by the ONU;

The OLT resolves the multicast upstream command, performs multicast control according to the multicast upstream command, and generates the corresponding multicast downstream command.

The multicast upstream commands include: a request for joining a multicast group, and a request for leaving a multicast group.

The multicast downstream commands include: consent to a multicast request, rejection of a multicast request, consent to leaving a multicast group, and forced leaving from a multicast group.

A PON multicast management method provided herein is detailed below with reference to FIG. 10 and FIG. 11, supposing an ONU requests to join a multicast group and requests to leave the multicast group.

Figure 10:
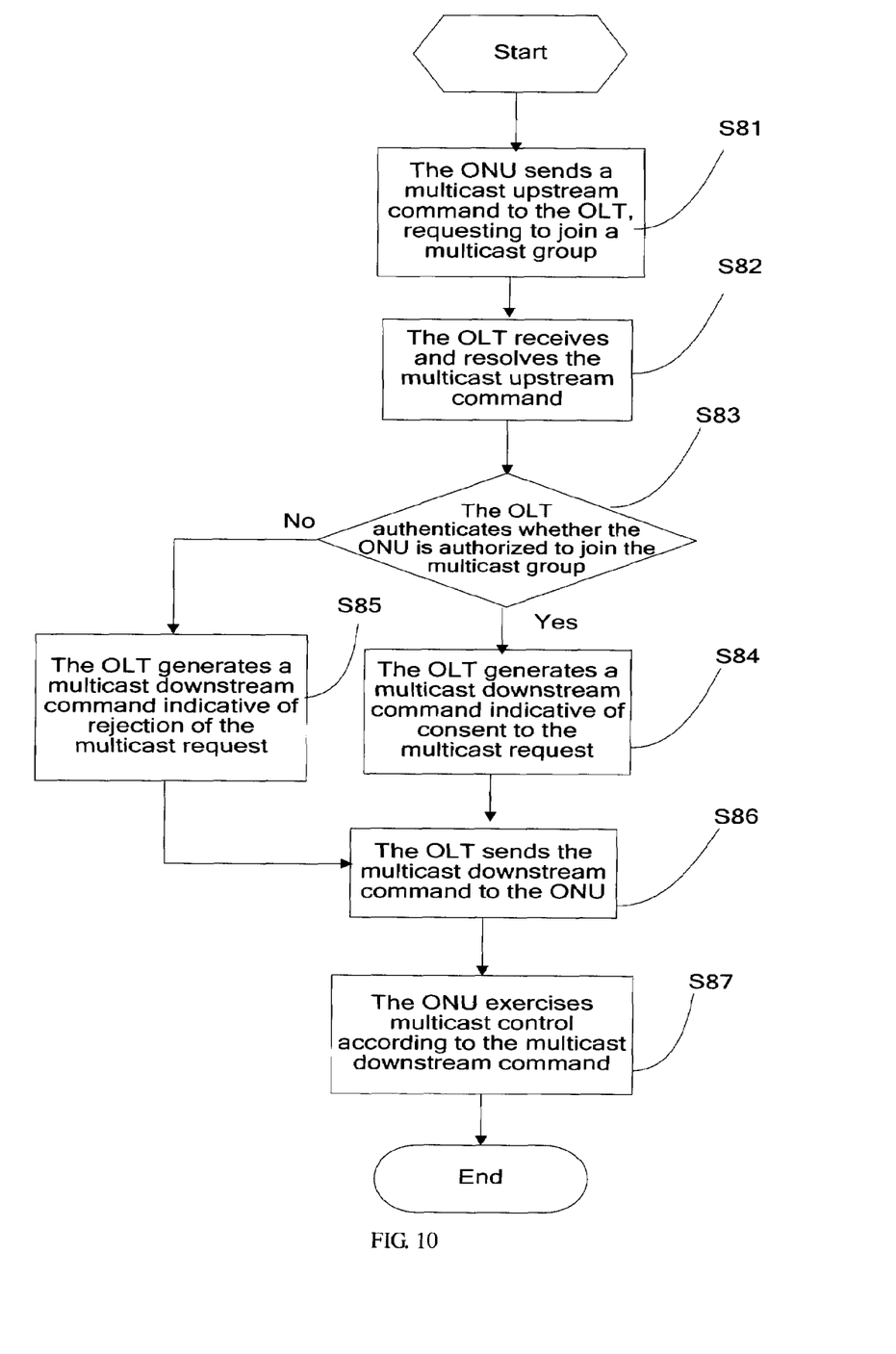
FIG. 10 shows a process in which an ONU requests to join a multicast group in a PON multicast management method in an embodiment of the present disclosure.
Figure 11:
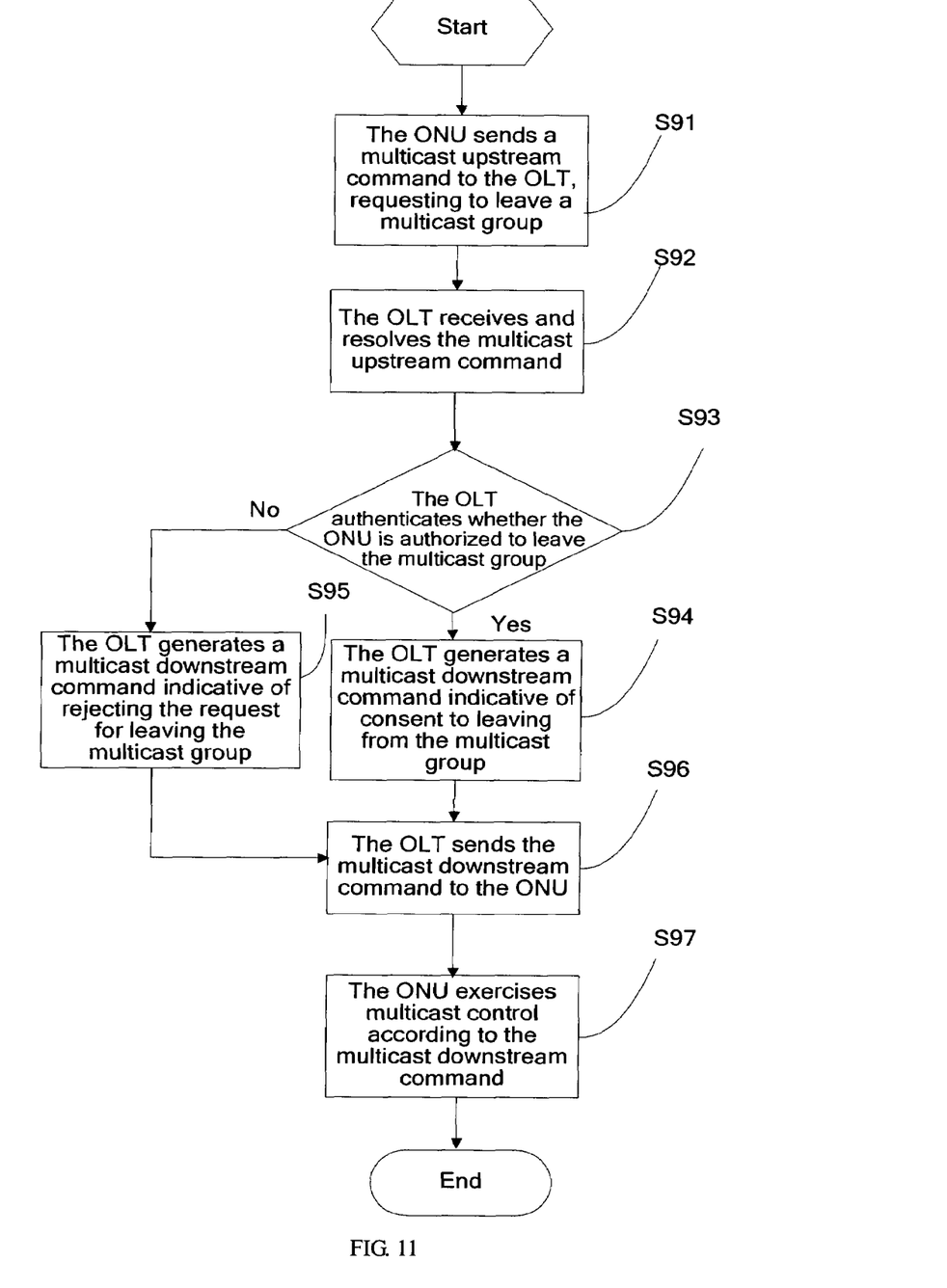
FIG. 11 shows a process in which an ONU requests to leave a multicast group in a PON multicast management method in an embodiment of the present disclosure.

FIG. 10 shows a process in which an ONU requests to join a multicast group in a PON multicast management method in an embodiment of the present disclosure, namely, the processing flow of the PON multicast communication system when the multicast upstream command is a request for joining a multicast group. The process includes the following steps:

Step S81: An ONU sends an upstream message to an OLT. The upstream message carries a multicast upstream command indicative of requesting to join a multicast group.

Step S82: After receiving the upstream message, the OLT extracts out the multicast upstream command and resolves it to obtain an ONU-ID, such as ONU2, a Command-ID, namely, a request for joining a multicast group, and the multicast group number, for example, 4, of the multicast group for joining.

Step S83: According to the stored rights information of the ONU, the OLT checks whether the ONU2 is authorized to join the multicast group 4. If the ONU2 is authorized, the process proceeds to step S84; otherwise, the process goes to step S85.

Step S84: The OLT allocates the multicast Port-ID of the multicast group 4 to the ONU2, and generates a multicast downstream command indicative of consent to the multicast request. The multicast downstream command is carried in a downstream message. The downstream message includes: ONU-ID (ONU2), Command-ID (consent to the multicast request), multicast group number (4), and multicast Port-ID, such as 4082. The process goes to step S86.

Step S85: The OLT generates a multicast downstream command indicative of rejecting the multicast request, without allocating a multicast Port-ID to the ONU2. The multicast downstream command is carried in a downstream message. The downstream message includes only: ONU-ID (ONU2), and Command-ID (rejection of the multicast request). The process proceeds to step S86.

Step S86: The OLT sends the downstream message carrying the multicast downstream command to the ONU2.

Step S87: After receiving the downstream message, the ONU2 resolves the multicast downstream command, and performs multicast control according to the multicast downstream command.

If the resolved multicast downstream command indicates consent to the multicast request, the ONU2 adds the multicast group information (including: multicast group number and multicast Port-ID) according to the command, and performs multicast communications through the multicast group.

If the resolved multicast downstream command indicates rejection of the multicast request, the ONU2 may go on requesting to join the multicast group or apply to the service provider for multicast rights.

Detailed above is a process of requesting to join a multicast group. With reference to FIG. 11, the process in which an ONU (still taking the ONU2 as an example) requests to leave a multicast group is described below, namely, the processing flow of the PON multicast communication system when the multicast upstream command is a request for leaving a multicast group:

Step S91: The ONU2 sends an upstream message to an OLT. The upstream message carries a multicast upstream command indicative of requesting to leave a multicast group.

Step S92: After receiving the upstream message, the OLT resolves the multicast upstream command to obtain an ONU-ID, namely, ONU2, a Command-ID, namely, a request for leaving a multicast group, and the multicast group number, namely, 4, of the multicast group for leaving.

Step S93: According to the stored rights information of the ONU, the OLT checks whether the ONU2 is authorized to leave the multicast group 4. If the ONU2 is authorized, the process proceeds to step S94; otherwise, the process goes to step S95.

Step S94: The OLT generates a multicast downstream command indicative of consent to leaving the multicast group. The multicast downstream command is carried in a downstream message. The downstream message includes: ONU-ID (ONU2), Command-ID (consent to leaving the multicast group), multicast group number (4), and multicast Port-ID. The process proceeds to step S96.

Step S95: The OLT generates a multicast downstream command indicative of rejecting the request for leaving the multicast group. The multicast downstream command is carried in a downstream message. The downstream message includes only: ONU-ID (ONU2), and Command-ID (rejection of the multicast request). The process proceeds to step S96.

Step S96: The OLT sends the downstream message carrying the multicast downstream command to the ONU2.

Step S97: After receiving the downstream message, the ONU2 resolves the multicast downstream command, and performs multicast control according to the multicast downstream command.

If the resolved multicast downstream command indicates consent to the request for leaving the multicast group, the ONU2 deletes the information about the multicast group 4 (including: multicast group number and multicast Port-ID) according to the command.

If the resolved multicast downstream command indicates rejection of the request for leaving the multicast group, the ONU2 ignores the request according to the command, and goes on with the communication in the multicast group 4.

It is worthy of attention that in the foregoing embodiment, the PON multicast management method may further include this step: The OLT forces the ONU to leave the multicast group, as detailed below:

The OLT changes the recorded multicast Port-ID of the ONU; or the OLT generates a multicast downstream command indicative of forced leaving from the multicast group, and delivers the command to the ONU, and the ONU deletes the multicast group information after receiving the command.

To make the technical solution under the present disclosure clearer, the multicast technology under the present disclosure is expounded below from a practical application perspective with reference to FIG. 12, FIG. 13, and FIG. 14.

Figure 12:
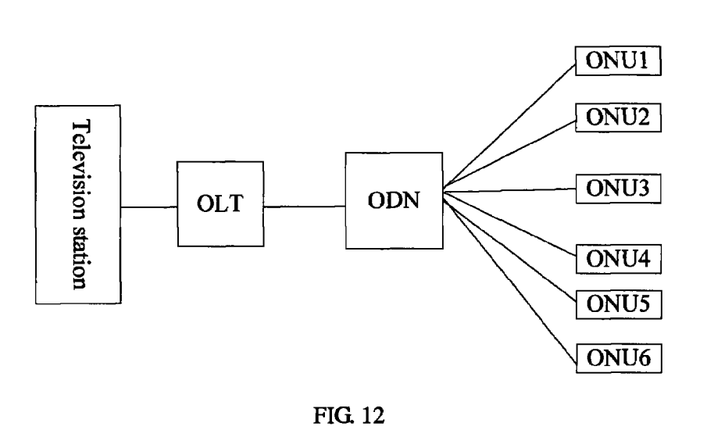
FIG. 12 shows a first embodiment of the present disclosure.

FIG. 12 shows the first embodiment of the present disclosure.

In the IPTV multicast communication, the video signals from a television station (or a service provider) are transmitted through a PON. The ONU at the user premises receives the desired television channel signals through a Port-ID. This embodiment supposes that the ONU1, ONU3 and ONU4 need to watch the program of the same channel, for example, channel 4, and the ONU1 and ONU3 are authorized to watch the program but the ONU5 is not authorized to watch the program. The service provider sets each channel as a multicast group, for example, channel 4 as multicast group 4, and transmits the program signals through multicast communications. The detailed process is as follows:

A. The multicast module of the ONU1, ONU3 and ONU5 sends a multicast upstream command to the OLT to watch the program on channel 4. The multicast upstream command indicates a request for joining the multicast group 4.

B. After receiving the upstream message from the ONU1, ONU3 and ONU5, the OLT resolves the multicast upstream command, and authenticates the ONUs.

C. After the authentication succeeds, the OLT adds ONU1 and ONU3 to multicast group 4, allocates the multicast Port-ID of multicast group 4 to ONU1 and ONU3, and generates a multicast downstream command (consent to the multicast request), which indicates the relevant multicast group information to ONU1 and ONU3.

ONU5 does not pass the authentication and is not authorized to join multicast group 4. Therefore, the OLT sends a multicast downstream command indicative of rejecting the multicast request to ONU5.

D. After receiving the multicast downstream command (consent to the multicast request), ONU1 and ONU3 configure the multicast group information according to the multicast downstream command, and watch the program on channel 4 through multicast group 4.

After receiving the multicast downstream command, ONU5 is unable to watch the program on channel 4, but can register rights information with the television station (or service provider), and then raise a multicast request again to watch the program.

In this embodiment, the program signals of channel 4 are sent to ONU1 and ONU3 simultaneously through multicast communications, without the necessity of making two copies of the same program signal and sending the two copies to ONU1 and ONU3 at different time like the practice in the prior art.

Figure 13:
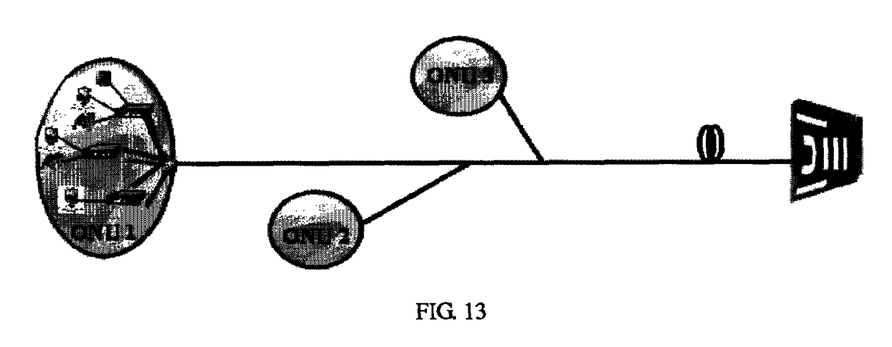
FIG. 13 shows a second embodiment of the present disclosure.

FIG. 13 shows the second embodiment of the present disclosure.

In a PON system, the distance from one ONU to one OLT is unequal to the distance from another ONU to the OLT. Therefore, the power of each ONU needs to be set separately. In practice, some ONUs are near to each other. Therefore, their transmit power may be set to be the same. This is more noticeable in the coming long-reach PON systems with a large split ratio. As shown in FIG. 13, three ONU groups (ONU group 1, ONU group 2, and ONU group 3) contain the ONUs which are near to each other, and the power may be set for the ONUs in the three groups uniformly. The three ONU groups may be treated as three multicast groups, and the power of the ONU group is adjusted through a multicast command. The multicast groups may be classified according to the Round Trip Time (RTT) or the transmission loss. The RTT is multiplied by the velocity (C) and then multiplied by the fiber loss (per kilometer) to obtain the transmission loss of the fiber. The transmission loss plus the loss caused by the optical splitter is the path loss of the ONU. Therefore, the upstream optical power of the multicast group may be set uniformly.

Figure 14:
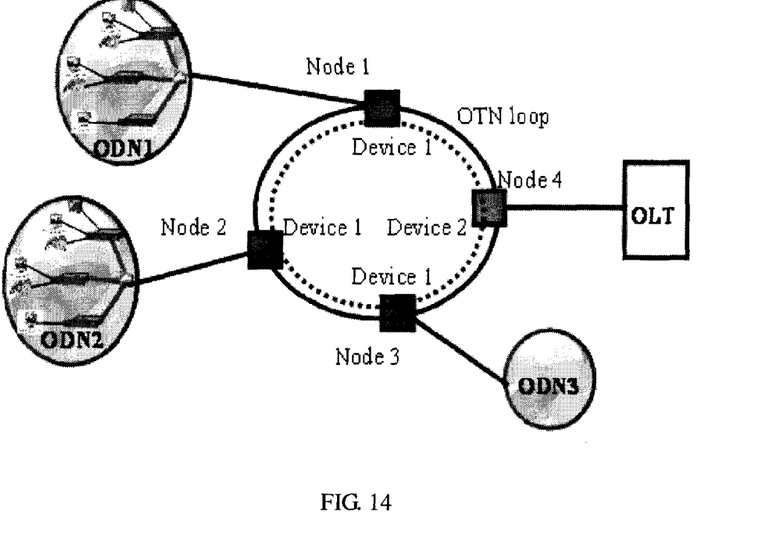
FIG. 14 shows a third embodiment of the present disclosure.

FIG. 14 shows the third embodiment of the present disclosure.

In a GPON over Optical Transport Network (OTN), as shown in FIG. 14, ODN1, ODN 2, and ODN 3 transmit signals to the OLT through node 1, node 2 and node 3. When there are too many ONUs in the PON system, the efficiency is low if the OLT delivers management information to each ONU directly, and the same command being sent repeatedly leads to a waste of bandwidth resources. After a PON multicast mechanism is introduced, in the GPON-over-OTN solution, the ONUs attached to each ODN form a multicast group, and a command is delivered to the multicast group. In this way, all the ONUs under each ONU are managed uniformly, and thus the efficiency is improved. If control needs to be performed on only one specific ONU, the control message is sent to this specific ONU. Therefore, the hierarchical management of multicast groups makes the management flexible, improves efficiency and reduces bandwidth waste.

Figure 15:
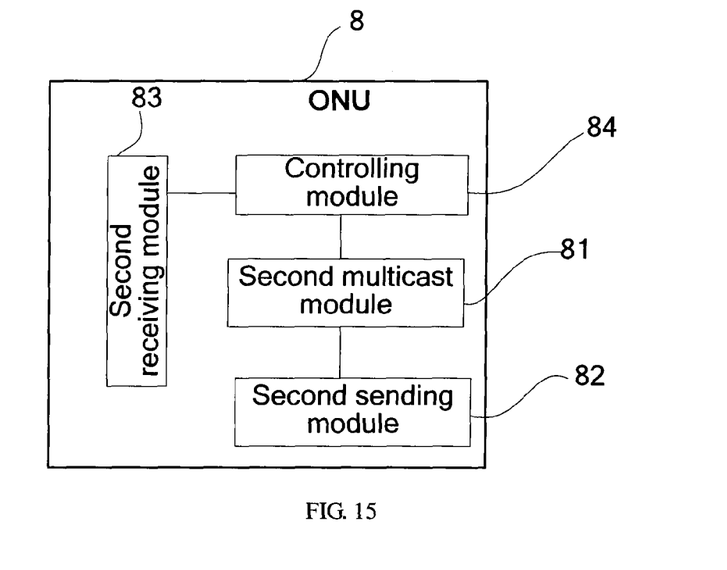
FIG. 15 shows a structure of an ONU in another embodiment of the present disclosure.

FIG. 15 shows a structure of an ONU in another embodiment of the present disclosure. ONU 8 includes a second multicast module 81 and a second sending module 82.

The second multicast module 81 is configured to generate a corresponding multicast upstream command inclusive of the multicast control information according to local multicast requirement information, where the local multicast requirement information includes information about a request for joining a multicast group, information about a request for leaving a multicast group, or information about a local current multicast group, or any combination thereof. The multicast control information is shown in Table 3. Possible local multicast requirement information is: information about an ONU requesting to join a multicast group, information about a request for leaving a multicast group, and information about a local current multicast group; or multicast control information generated according to the downstream command in the downstream message of the OLT.

The second sending module 82 is configured to send an upstream message carrying the multicast upstream command to the OLT.

Optionally, ONU 8 may further include:

a second receiving module 83 configured to receive the downstream message from the OLT; and a controlling module 84 configured to: analyze the downstream message received by the second receiving module to obtain a multicast downstream command, and generate multicast control information according to the multicast downstream command.

To sum up, according to the PON multicast communication system, the multicast management method, the OLT, and the ONU provided herein, a multicast module is added to the OLT and the ONU to perform multicast control in a PON system and to enable multicast communications of the PON system. Therefore, the PON multicast functions are enhanced, and the same data destined for multiple ONUs is prevented from being sent repeatedly in the network, and thus the network bandwidth resources are saved. In the ONU management and power adjustment, a group of ONUs which are close to each other may be managed uniformly, thus improving the system efficiency.

Although the disclosure has been described through exemplary embodiments, the disclosure is not limited to such embodiments. It is apparent that those skilled in the art can make various modifications and variations to the disclosure without departing from the scope of the disclosure. The disclosure is intended to cover the modifications and variations provided that they fall in the scope of protection defined by the following claims or their equivalents.

What is claimed is:

1. An Optical Line Terminal (OLT), comprising:
    a first receiving module, configured to receive an upstream message from an Optical Network Unit (ONU);

a control processing module, configured to obtain multicast control information in the upstream message; wherein the multicast control information includes a multicast group number and a multicast port ID, and the multicast control information is a multicast upstream command carried in the upstream message, and the upstream message further includes: an ONU-ID, a Message-ID, a Command-ID, and a multicast group number;

a first multicast module, configured to perform multicast control according to the multicast control information, and generate a multicast downstream command carried in a downstream message according to the multicast control information;

wherein the first multicast module comprises a multicast authenticating unit and a first multicast controlling unit;

wherein the multicast authenticating unit is configured to check whether the ONU corresponding to the multicast control information is authorized to join a multicast group according to stored rights information of the ONU; and wherein the first multicast controlling unit is connected to the multicast authenticating unit and configured to generate a multicast downstream command carried in a downstream message according to the multicast control information when an authentication result of the multicast authenticating unit indicates consent to joining the multicast group, wherein the downstream message includes: an ONU-ID, a Message-ID, a Command-ID, a multicast Port-ID, and a multicast group number; and a first sending module, configured to generate the downstream message carrying the multicast downstream command according to the multicast control information and send the downstream message to the ONU.

2. The OLT of claim 1, wherein:

the multicast downstream command includes one or more of: consent to a multicast request, rejection of the multicast request, consent to leaving the multicast group, and forced leaving from the multicast group; and the multicast upstream command includes one or more of a request for joining the multicast group, or a request for leaving the multicast group.

3. An Optical Network Unit (ONU), comprising:

a second multicast module configured to generate a multicast upstream command according to local multicast requirement information, wherein the local multicast requirement information comprises information about a request for joining a multicast group, information about a request for leaving the multicast group, or information about a local current multicast group, or any combination thereof;

a second sending module configured to send an upstream message carrying the multicast upstream command to an Optical Line Terminal (OLT);

a second receiving module, configured to receive a downstream message from the OLT; and a controlling module, configured to: analyze the downstream message received by the second receiving module to obtain a multicast downstream command, generate multicast control information according to the multicast downstream command, and perform multicast control;

wherein the multicast control information includes a multicast group number and a multicast port ID, the upstream message further includes: an ONU-ID, a Message-ID, a Command-ID, and a multicast group number, and the downstream message further includes: an ONU-ID, a Message-ID, a Command-ID, a multicast Port-ID, and a multicast group number.

4. The ONU of claim 3, wherein:

the multicast upstream command includes a request for joining the multicast group, or a request for leaving the multicast group; and the multicast downstream command includes one or more of: consent to a multicast request, rejection of the multicast request, consent to leaving the multicast group, and forced leaving from the multicast group.

5. A Passive Optical Network (PON) multicast communication system, comprising:

an Optical Line Terminal (OLT); and an Optical Network Unit (ONU) connected to the OLT through an Optical Distribution Network (ODN), wherein:

the OLT comprises:

a first receiving module, a control processing module and a first multicast module, wherein the first receiving module is configured to receive an upstream message from the ONU;

the control processing module is configured to obtain a multicast control information in the upstream message; wherein the multicast control information includes a multicast group number and a multicast port ID, and the multicast control information is an multicast upstream command carried in the upstream message, and the upstream message further includes: an ONU-ID, a Message-ID, a Command-ID, and a multicast group number;

the first multicast module is configured to perform multicast control according to the multicast control information, and generate a multicast downstream command carried in a downstream message according to the multicast control information;

wherein the first multicast module comprises a multicast authenticating unit and a first multicast controlling unit, wherein the multicast authenticating unit is configured to check whether the ONU corresponding to the multicast control information is authorized to join a multicast group according to stored rights information of the ONU, and the first multicast controlling unit is connected to the multicast authenticating unit and configured to generate a multicast downstream command carried in a downstream message according to the multicast control information when an authentication result of the multicast authenticating unit indicates consent to joining the multicast group;

wherein the downstream message includes: an ONU-ID, a Message-ID, a Command-ID, a multicast Port-ID, and a multicast group number; and a first sending module, configured to: generate the downstream message carrying the multicast downstream command according to the multicast control information, and send the downstream message to the ONU; and the ONU comprises:

a first receiving module, a control processing module and a first multicast module, wherein the first receiving module is configured to receive an upstream message from the ONU;

the control processing module is configured to obtain a multicast control information in the upstream message; wherein the multicast control information includes a multicast group number and a multicast port ID and the multicast control information is an multicast upstream command carried in the upstream message, and the upstream message includes: an ONU-ID, a Message-ID, a Command-ID, and a multicast group number;

the first multicast module is configured to perform multicast control according to the multicast control information, and generate a multicast downstream command carried in a downstream message according to the multicast control information;

wherein the first multicast module comprises a multicast authenticating unit and a first multicast controlling unit;

wherein the multicast authenticating unit is configured to check whether the ONU corresponding to the multicast control information is authorized to loin a multicast group according to stored rights information of the ONU, and the first multicast controlling unit is connected to the multicast authenticating unit and configured to generate a multicast downstream command carried in a downstream message according to the multicast control information when an authentication result of the multicast authenticating unit indicates consent to joining the multicast group;

wherein the downstream message includes: an ONU-ID, a Message-ID a Command-ID, a multicast Port-ID, and a multicast group number; and a first sending module, configured to: generate the downstream message carrying the multicast downstream command according to the multicast control information, and send the downstream message to the ONU.

* * * * *